Nov. 5, 1935.  H. J. J. JANSSEN  2,019,785
PROCESS FOR THE PRODUCTION OF METAL FROM ORES
Filed July 31, 1933
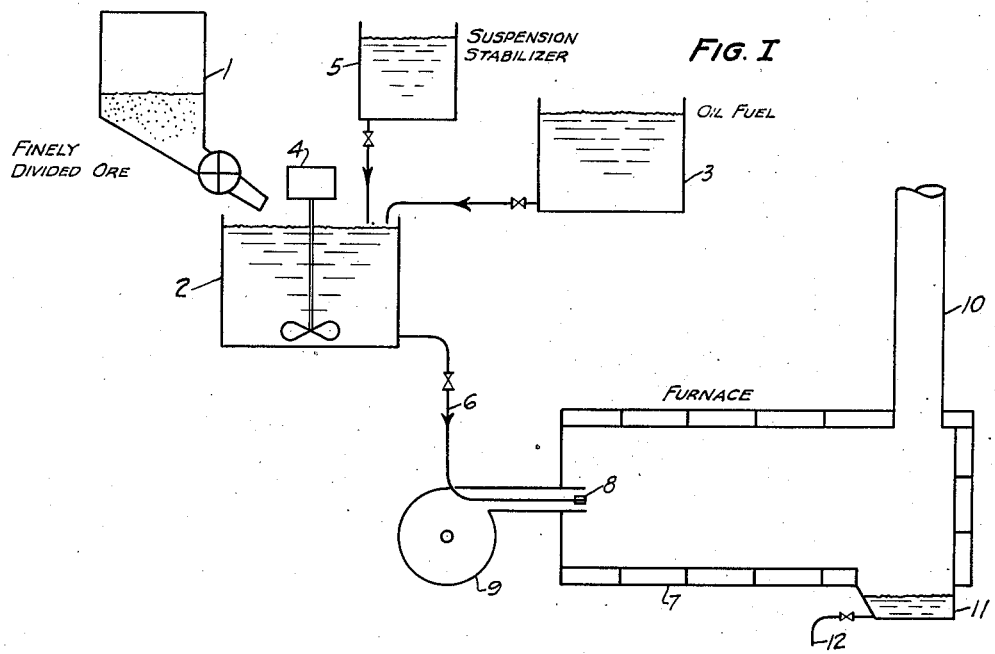
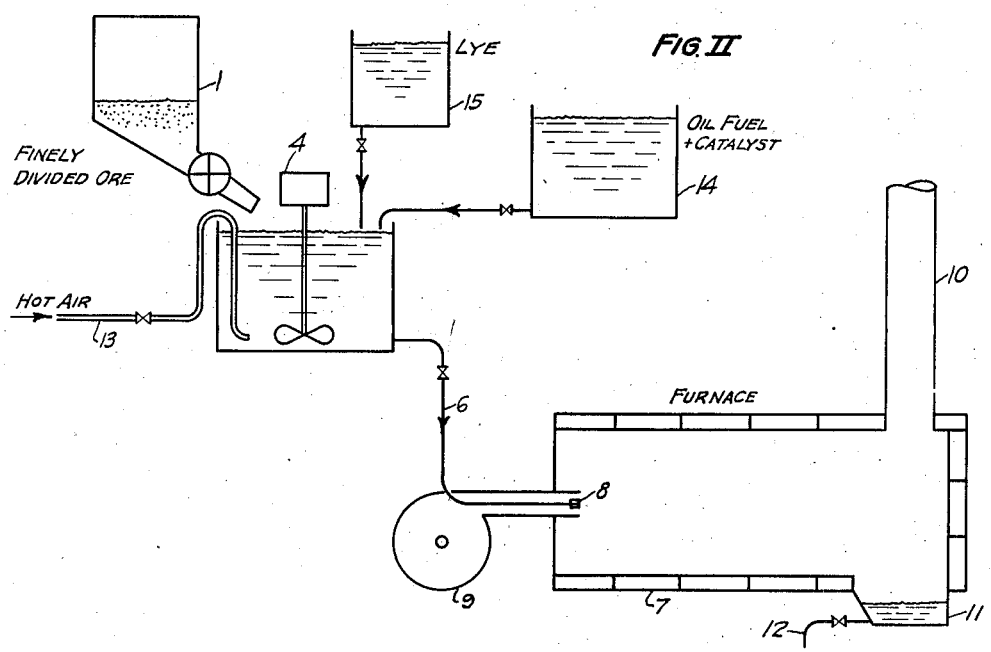
Inventor: Hendrik J. J. Janssen
By his Attorney Patented Nov. 5, 1935

2,019,785

UNITED STATES PATENT OFFICE 2,019,785

PROCESS FOR THE PRODUCTION OF METAL FROM ORES

Hendrik Jan Jacob Janssen, The Hague, Netherlands, assignor to Shell Development Company, San Francisco, Calif., a corporation of Delaware Application July 31, 1933, Serial No. 683,015
In the Netherlands August 30, 1932

2 Claims. (Cl. 75—17)

This invention relates to the production of metal from ores by reduction with the aid of a liquid fuel such as oil, by means of which the ores are heated to the high temperature required for the reduction process and by which, if necessary, undesirable components of the ore can be eliminated.

The object of this invention is to provide an easily controlled and quick process by which metals may be obtained from their ores.

The further objects of the invention will be apparent from the following description.

According to this invention the ore to be reduced is introduced in finely divided form into the liquid fuel before the latter is ignited and burnt with such a limited quantity of air that a reducing flame is obtained. The heat of combustion and the reducing atmosphere cause a reduction of the finely divided particles of ore.

The ore is preferably so finely distributed in the liquid fuel that it forms a suspension in the liquid fuel. For dispersing the ore in the liquid fuel use can be made of the usual devices for dispersion of a solid in a liquid. In some cases it may be necessary to employ stabilizers in order to render the suspension sufficiently stable. Stabilizers such as certain soaps may be added to the suspension or stabilizers may be caused to form in the oil serving as fuel. These stabilizers may be formed in the oil by first forming fatty acids in the oil by blowing the oil with hot air in the presence of a suitable catalyst. Thereafter by adding a suitable lye to the oil, soaps having stabilizing properties may be formed. Besides the ore itself any other substance required for the process, for example, a flux may be added to or suspended in the liquid fuel.

The fuel with the ore in suspension is atomized with air in a combustion space. The air is introduced into the combustion space in such quantities that a reducing atmosphere is produced. In the combustion chamber the particles of ore, being exposed on all sides to the effect of the heat and the reducing gases, are quickly reduced.

The metal particles can be removed from the stream of combustion gases by suitable precipitating means as will be apparent to those skilled in the art. The combustion gases are not completely burnt owing to the reducing conditions existing in the combustion chamber. Additional air may be mixed into these gases after the metal has been precipitated and the heat thus developed can be used for externally heating the walls of the combustion chamber in which the reduction is effected or for any other purpose, for example, preheating the oil or finely divided ore entering into the process.

Fig. I is a diagrammatic elevation of apparatus suitable for carrying out one embodiment of the invention. Fig. II is a diagrammatic elevation of apparatus suitable for carrying out a variation of the process. Referring to Fig. I, finely crushed ore from hopper 1 is discharged into the mixer 2, into which amounts of oil fuel from tank 3 have been previously run. The ore is mixed with the oil by means of a stirrer 4, at the same time amounts of a suspension stabilizer for example a suitable soap, are added to the mixer from tank 5. The resulting fuel slurry is withdrawn from the mixer through pipe 6, is atomized and discharged into a furnace 7 through a nozzle 8. Controlled amounts of air are introduced into the furnace by an air blower 9. The hot combustion gases leave the furnace through stack 10. The molten metal collects in a trough 11 at the bottom of the furnace from which it can be periodically withdrawn through a pipe 12. Referring to Fig. II wherein like parts are given like numerals the process is in general carried out in the same manner as with the apparatus shown in Fig. I, except that instead of adding a suspension stabilizer to the mixture of ore and oil, the stabilizer is caused to form in the mixer. For this purpose the mixer 2 is provided with a hot air inlet pipe 13. Oil fuel admixed with amounts of a suitable catalyst for the formation of fatty acids by air oxidation, is run into the mixer 2 from tank 14. The oil fuel is agitated by means of the stirrer 4 at the same time hot air is blown into the mixer through pipe 13 resulting in the formation of amounts of fatty acid. A suitable lye from tank 15 and finely divided ore from the hopper 1 are then run into the mixer. As a result, a fuel slurry is formed which is withdrawn and used in the same manner as the fuel mixture produced in the process described in connection with Fig. I.

The reduction is controlled first, by regulating the quantity of ore suspended in the fuel, and secondly, by regulating the quantity of air entering the combustion chamber. The quantity of ore in the fuel can be regulated in a simple manner by mixing a quantity of fuel having a constant ore content with a quantity of fuel containing no ore.

This process is suitable for the reduction of such ores as, tinstone ($SnO_2$) zinc oxide (ZnO) and iron oxides ($Fe_2O_3$ and $Fe_3O_4$) although I may apply the process to other easily reducible ores.

If it is desired to obtain metal with increased surface or metal in a finely divided state such metal can be obtained by the use of my process by regulating the operation so that the sintering temperature of the metal is not reached.

It will be readily understood by those skilled in the art that I may mix the ore with a suitable gas fuel instead of with a liquid fuel and inject the mixture into a combustion chamber and carry out the process as with a liquid fuel.

I claim as my invention:

1. A process for the production of metal from ores comprising suspending ore in a liquid fuel, adding a suspension stabilizer to said fuel and ore whereby a fuel slurry is formed, thereafter atomizing said fuel slurry and burning the same with such quantity of air that incomplete combustion takes place and the metal ore is reduced.

2. A process for the production of metal from ores comprising mixing a liquid fuel with finely divided ore, blowing air therethrough in the presence of an oxidizing catalyst to obtain fatty acids, adding a lye to the mixture to form soaps of the fatty acids and thereafter atomizing the fuel slurry thus produced and burning said slurry with such quantity of air that incomplete combustion takes place and the metal ore reduced.

HENDRIK JAN JACOB JANSSEN.